United States Patent
Ryan

[11] 3,922,416
[45] Nov. 25, 1975

[54] MEDIUM FOR RECORDING PHASE HOLOGRAMS

[75] Inventor: Robert James Ryan, Trenton, N.J.

[73] Assignee: RCA Corporation, New York, N.Y.

[22] Filed: Aug. 18, 1972

[21] Appl. No.: 282,076

[52] U.S. Cl. ............... 428/172; 350/3.5; 428/425; 428/480
[51] Int. Cl.² ............... B29D 11/00; G02B 27/22
[58] Field of Search ............ 117/138.8 A, 138.8 F, 117/138.8 UA, 36.7, 211, 11, 143 A, 145, 117/161 K, 161 KP; 106/37; 96/27 H

[56] References Cited
UNITED STATES PATENTS

| | | | |
|---|---|---|---|
| 2,698,239 | 12/1954 | Alles et al. | 95/9 |
| 2,779,684 | 1/1957 | Alles | 117/7 |
| 2,829,080 | 4/1958 | Fessler et al. | 154/50 |
| 3,048,564 | 8/1962 | Heffelfinger | 260/75 |
| 3,118,785 | 1/1964 | Anderson et al. | 117/211 |
| 3,118,786 | 1/1964 | Katchman et al. | 117/211 |
| 3,118,787 | 1/1964 | Katchman | 117/211 |
| 3,247,017 | 4/1966 | Eichler et al. | 117/138.8 |
| 3,413,146 | 11/1968 | Anderson et al. | 117/211 |
| 3,480,592 | 11/1969 | Dieterich et al. | 260/77.5 |
| 3,505,096 | 4/1970 | Egitto et al. | 117/56 |
| 3,534,120 | 10/1970 | Ando et al. | 260/873 |
| 3,535,417 | 10/1970 | Henkes | 264/227 |
| 3,582,398 | 6/1971 | Ringler | 117/33.3 |
| 3,653,938 | 4/1972 | Obuchi et al. | 117/15 |
| 3,699,189 | 10/1972 | Downey | 260/873 |
| 3,703,407 | 11/1972 | Hannan et al. | 117/138.8 |
| 3,758,649 | 9/1973 | Frattarola | 264/1 |

*Primary Examiner* — P. E. Willis, Jr.
*Attorney, Agent, or Firm* — Glenn H. Bruestle; Birgit E. Morris

[57] ABSTRACT

A transparent polymer substrate having an adhesive coating of an optically clear, embossable thermoplastic resin thereon, is an improved medium for recording holographic information.

11 Claims, No Drawings

MEDIUM FOR RECORDING PHASE HOLOGRAMS

IMPROVED MEDIUM FOR RECORDING PHASE HOLOGRAMS

This invention relates to an improved recording medium. More particularly, this invention relates to a transparent substrate coated with an optically clear, embossable, thermoplastic resin in which holographic information of improved quality can be recorded.

BACKGROUND OF THE INVENTION

Bartolini et al. have described a holography process for storage and playback of video information in Applied Optics, 9, 2283 (1970).

Phase holograms for recording video information in the form of a three-dimensional relief pattern are made by exposing the information into a photosensitive medium, such as a photoresist on a flexible substrate, and developing the information in known manner. The developed information is replicated in permanent form by electroforming a metal master of the original developed medium. This is a negative from which positive replicas can be made by embossing into a thermoplastic medium. This process requires an embossable thermoplastic medium having very good optical qualities. Since the holographic information is very small in size, on the order of 1000–2000 A deep, any surface or optical defects in the thermoplastic medium results in light scattering, lens effects, and loss of signal during playback. Cast vinyl films have been used heretofore in this process, due to their excellent bulk optical clarity and embossability; however, a film suitable for commercial quality relication and readout of video information for phase holography has not been obtainable up to now, since the mechanics of casting, calendering or extruding high quality film results in some surface irregularities which interfere with and distort the recorded information. In addition, cast vinyl films have low strength, poor dimensional stability and are easily distorted during handling, resulting in consequent distortion and loss of the recorded information. Other transparent polymer substrates, particularly photographic grade, biaxially oriented, polyethylene terephthalate films, have much better optical properties than cast vinyl films and fewer surface imperfections, and also have much higher strength; however, such films are not embossable to the extent required for replication of holographic information.

SUMMARY OF THE INVENTION

It has been discovered that transparent polymer substrates can be coated with certain adherent, film-forming, embossable, optically clear thermoplastic resins, which provide an excellent medium for recording and storage of holographic information.

DETAILED DESCRIPTION OF THE INVENTION

Suitable polymeric substrates for holographic recording media include transparent polymers such as linear polyesters, acrylic resins, cellulose acetate resins, polycarbonate resins and the like. The substrates can be in the form of sheet, film, tape and the like. The preferred substrates are ethylene terephthalate polymers. Optical quality, oriented polyethylene terephthalate film is readily available commercially; suitable products include Cronar, sold by the duPont Company, or Celanar, sold by Celanese Corporation. Such polyethylene terephthalate films are available in a variety of widths and thicknesses. In particular, a substrate film useful in the present invention for holographic storage is a tape about 0.0005–0.0020 inch in thickness and 8–16 mm in width. Of course, thicker substrates can be employed for applications such as microfiche, microcards and the like.

The thermoplastic coating must strongly adhere to the transparent substrate to form an optically clear embossable surface coating of uniform thickness. Coating resins suitable for use in the invention include linear polyesters alone or in combination with a vinyl resin, and thermoplastic polyester-based polyurethane coating resins. Vinylidene chloride resins, transparent acrylic resins and their copolymers are also suitable. The coating can be applied to the substrate from the melt, as by a co-extrusion process, but is preferably applied from solution.

Linear polyesters which can be employed include PE-200, available from Goodyear Chemical Company and believed to be a polyester of ethylene glycol, terephthalic acid and sebacic acid having a molecular weight in the range of about 20,000 to 30,000.

In the event it is desired to store the recording medium in the form of a wound tape, or other manner wherein one layer is in contact with another layer, the use of linear polyester coatings has the disadvantage that they are somewhat tacky. It has been found that the polyester can be admixed with a minor amount, such as from 1 to 20% by weight, preferably about 5 to 10% by weight, of a thermoplastic vinyl resin, such as a vinyl copolymer of vinyl chloride and vinyl acetate and/or vinyl alcohol. A series of vinyl chloride copolymers is available from Union Carbide Corp., containing from about 10 to about 20% by weight of polyvinyl acetate and up to about 5.5% of polyvinyl alcohol having molecular weights of from about 10,000 to about 35,000. The addition of a vinyl resin reduces the tack of the polyester coating layer without detracting from the optical quality or embossability of the resultant coating. Other anti-tack agents known to one skilled in the art can also be added in place of, or in addition to, a vinyl resin.

Thermoplastic polyester-based polyurethane coating resins are also useful as the coating layer. Suitable resins include ALFA-841 polyurethane, commercially available from Baker Castor Oil Company and the Vithane polyurethanes, commercially available from Goodyear Chemical Co. Anti-tack modifiers such as cellulose acetate butyrate in amounts up to about 20% by weight can also be added to these resins.

The coating layer in solution can be applied to the substrate by any convenient means, as by roller coating, brush coating, doctor blade application and the like. The amount of solvent employed is not critical, and is adjusted depending on the coating method used, as is known to one skilled in the art. For example, a coating having a viscosity of about 5–10 centipoises is employed for a roller coating technique, whereas a solution of higher viscosity, on the order of about 100 centipoises, is employed when a doctor blade method is employed. The solvent is removed from the substrate in any convenient manner, as by drying in an oven, vacuum drying, evaporation and the like. Preferably, a layer about 0.5 to about 4 microns in thickness is deposited on the transparent substrate.

The invention will be further illustrated by the following examples, but it is to be understood that the invention is not meant to be limited to the details described therein. In the examples, all parts and percentages are by weight.

EXAMPLE 1

Ten parts of a 7% solution of PE-200 polyester in cellosolve acetate and one part of a 7% solution of VYNS vinyl resin of Union Carbide Corp. containing 10% of polyvinyl acetate and having a molecular weight of about 34,000 in tetrahydrofuran were admixed to form a clear solution. A layer of about 1 mil in thickness was roller coated onto a 16 mm oriented polyethylene terephthalate tape and dried to produce a dry coating thickness of about 2 microns.

The resultant coated film was completely clear and smooth with no observable optical defects.

The coated film was embossed by pressing at 45 psi against a nickel master tape having holographic video information thereon which had been preheated to 130°C. at a rate of 2 ½"/sec. Excellent replication of the holographic information in the coated film surface was obtained with no loss in signal-to-noise ratio during playback.

EXAMPLE 2

The procedure of Example 1 was repeated except using as the coating layer a 4% solution of ALFA-841 polyurethane in cellosolve. An excellent replica of holographic video information was embossed into the coated tape.

I claim:

1. A holographic recording medium which consists essentially of a transparent polymer substrate coated with an adherent, uniform, embossable, optically clear thermoplastic resin wherein the embossable resin is selected from the group consisting of
   a. polyester-based polyurethanes;
   b. polyester-based polyurethanes containing an antitacking agent;
   c. linear polyesters derived from ethylene glycol, terephthalic acid, and sebacic acid, said polyesters having a molecular weight in the range between about 20,000 to about 30,000; and
   d. said linear polyesters containing an anti-tacking agent, the surface of said resin having embossed thereon holographic information in the form of a three-dimensional relief pattern.

2. A medium according to claim 1 wherein the substrate is selected from the group consisting of linear polyesters, acrylic resins, cellulose acetate resins and polycarbonate resins.

3. A medium according to claim 2 wherein the substrate is a film of an ethylene terephthalate polymer.

4. An embossable holographic recording medium consisting essentially of a transparent polymer substrate coated with a thermoplastic polyester-based polyurethane coating resin.

5. A medium according to claim 1 wherein the coating resin is a polyester derived from ethylene glycol, terephthalic acid and sebacic acid, said polyester having a molecular weight in the range between about 20,000 and about 30,000.

6. A medium according to claim 1 wherein the linear polyester coating resin contains an antitacking agent which is a vinyl polymer in an amount up to about 20% by weight of the polyester.

7. A medium according to claim 6 wherein the vinyl polymer is a copolymer of vinyl chloride and about 10 to about 20% by weight of the copolymer of vinyl acetate.

8. A medium according to claim 7 wherein the substrate is a biaxially oriented polyethylene terephthalate film.

9. A medium according to claim 4 wherein the substrate is a biaxially oriented polyethylene terephthalate film.

10. A medium according to claim 9 having embossed holographic information in the form of a three-dimensional relief pattern thereon.

11. A medium according to claim 1 wherein the antitacking agent in the polyester-based polyurethane coating resin is a cellulose acetate butyrate and said coating resin is up to about 20% by weight cellulose acetate butyrate.

* * * * *